United States Patent
Maxey (10) Patent No.: US 7,124,674 B2
(45) Date of Patent: Oct. 24, 2006

(54) PROTECTIVE SPOOL DISPENSER AND CUTTER

(75) Inventor: James Dewey Maxey, Davidsonville, MD (US)

(73) Assignee: NB Properties, LLC, Davidsonville, MD (US)

(*) Notice: Subject to any disclaimer, the term of this patent is extended or adjusted under 35 U.S.C. 154(b) by 216 days.

(21) Appl. No.: 10/834,106

(22) Filed: Apr. 29, 2004

(65) Prior Publication Data

US 2004/0216576 A1   Nov. 4, 2004

Related U.S. Application Data

(60) Provisional application No. 60/466,722, filed on May 1, 2003.

(51) Int. Cl.
*B26D 7/00* (2006.01)

(52) U.S. Cl. .................. 83/649; 83/607; 242/129.8

(58) Field of Classification Search .......... 83/949–950, 83/597–612, 607, 648–650, 520, 609; 225/34, 225/46; 242/134, 138, 129.8; 30/513; 118/36
See application file for complete search history.

(56) References Cited

U.S. PATENT DOCUMENTS

| | | | | |
|---|---|---|---|---|
| 834,790 A | * | 10/1906 | Wolford | 83/611 |
| 1,910,380 A | * | 5/1933 | Daum | 83/466.1 |
| 2,209,859 A | * | 7/1940 | Taylor | 83/167 |
| 3,527,373 A | * | 9/1970 | Giraudet et al. | 220/345.1 |
| 3,696,697 A | * | 10/1972 | Hoffman | 83/649 |
| 3,780,964 A | | 12/1973 | Gonzalez | |
| 3,856,230 A | | 12/1974 | Zimmer | |
| 3,987,694 A | * | 10/1976 | Kaufman | 83/453 |
| 4,083,268 A | * | 4/1978 | Kober | 81/9.4 |
| 4,111,089 A | | 9/1978 | Montaruli | |
| 4,239,164 A | * | 12/1980 | Barnsbee et al. | 242/419.4 |
| 4,385,738 A | | 5/1983 | McDonald | |
| 4,591,109 A | | 5/1986 | Kremer | |
| 4,978,085 A | | 12/1990 | Letourneau | |
| 5,044,243 A | * | 9/1991 | Aizawa | 83/558 |
| 5,222,683 A | * | 6/1993 | Blackshire | 242/137.1 |
| 5,285,981 A | * | 2/1994 | Pavelka | 242/557 |
| 5,316,232 A | | 5/1994 | Lambert, Jr. | |
| 5,322,236 A | * | 6/1994 | Smith | 242/129.8 |
| 5,566,873 A | * | 10/1996 | Guido | 225/106 |
| 5,634,610 A | | 6/1997 | Walsh | |
| 5,647,261 A | * | 7/1997 | Wierenga | 83/649 |
| 5,727,721 A | * | 3/1998 | Guido et al. | 225/106 |
| 5,927,173 A | * | 7/1999 | Lyons et al. | 83/650 |
| 5,944,280 A | | 8/1999 | Dimitri | |
| 5,967,451 A | | 10/1999 | Radaios | |
| 6,059,220 A | * | 5/2000 | Lassiter | 242/557 |

(Continued)

*Primary Examiner*—Boyer D. Ashley
*Assistant Examiner*—Kenneth E. Peterson
(74) *Attorney, Agent, or Firm*—Berenato, White & Stavish (57) ABSTRACT

The present invention relates to a protective spool dispenser that is portable, efficient and convenient for dispensing line. The dispenser has four corner members and upper and lower sidebars, forming a box-like outer frame. A crossbar extends between two adjacent corner members. A spool-receiving arm extends from the crossbar. The end of the spool-receiving arm opposite the crossbar is unsecured, so that a spool of line may be easily slid onto the arm. The arm includes a tensioning spring, two washers and a fastening pin. The spool is sandwiched between the two washers. Free spinning is prevented due to the tensioning spring. The disclosed dispenser also preferably includes a cutter mechanism for cutting line to desired lengths.

22 Claims, 9 Drawing Sheets

U.S. PATENT DOCUMENTS

| | | |
|---|---|---|
| 6,086,013 A | 7/2000 | Looney, Jr. et al. |
| 6,270,094 B1 * | 8/2001 | Campbell ................ 280/47.19 |
| 6,422,504 B1 | 7/2002 | Elder |
| 6,523,776 B1 | 2/2003 | Elder |
| 2003/0006335 A1 | 1/2003 | Gaudio |
| 2003/0052218 A1 | 3/2003 | Knizner |

* cited by examiner

PROTECTIVE SPOOL DISPENSER AND CUTTER

CROSS-REFERENCE TO RELATED APPLICATION AND CLAIM TO PRIORITY

This application is based on provisional application Ser. No. 60/466,722, filed May 1, 2003, for James D. Maxey, the disclosure of which is incorporated herein by reference and to which priority is claimed under 35 U.S.C. §120.

FIELD OF THE INVENTION

The present invention relates to a protective spool dispenser that is portable, efficient and convenient for dispensing line. The dispenser has four corner members and upper and lower sidebars, forming a box-like outer frame. A crossbar extends between two adjacent corner members. A spool-receiving arm extends from the crossbar. The end of the spool-receiving arm opposite the crossbar is unsecured, so that a spool of line may be easily slid onto the arm. The arm includes a tensioning spring, two washers and a fastening pin. The spool is sandwiched between the two washers. Line from the spool is prevented from free spinning due to the tensioning spring. The disclosed dispenser also preferably includes a cutter mechanism for cutting line to desired lengths.

BACKGROUND OF THE INVENTION

There are numerous designs for wire reel and spool holders. However, prior designs have not always been satisfactory. For example, many spool holder designs fail to prevent snarling, kinking, tangling and looping of wire on a coiled spool, particularly during unwinding or dispensing of the wire from the spool. If the wire or line is relatively lightweight, such as plastic line or cord, the spool may be especially prone to spinning freely and thereby unwinding.

Some designs provide for a shell or casing that houses a spool in an attempt to limit continuous or uncontrolled unwinding of the wire. Typically, such a casing dismantles into several parts. The wire is then wound around a core, and dispensed through an opening in the casing. Although such designs protect the wire, they do not provide an efficient or convenient dispensing means, particularly when a relatively large quantity of wire or line must be dispensed. It is often difficult to ascertain how much wire or line is remaining on the spool. In addition, it is often difficult to replace an exhausted spool with a new spool of line, given the housing of such dispensers must be disassembled to replace the exhausted spool.

Other designs provide for a partially open housing or frame, having first and second side walls spaced from each other, and a support bar for holding a spool therebetween and for reducing free spinning when dispensing wire from the spool by creating frictional forces on the spool when dispensing. Although such designs provide some advantages, they often fail to provide adequate protection for the spool. For example, spools of plastic trimmer line used for commercial string trimmers used to cut grass and/or weeds are often used by landscaping crews. In addition to the string trimmers, landscapers often use other heavy equipment. All of the equipment is commonly transported from site to site in a pick-up truck bed or an open trailer, and is frequently subject to jostling, shifting and/or bumping with other equipment. Many trimmer line spools are easily damaged if unprotected, particularly during transport of the spools and equipment. In addition, trimmer line spools are typically made from inexpensive plastic. If the plastic spool is damaged, the plastic line may become tangled, kinked, or unwound. The line must then be de-tangled, organized, or simply discarded, thereby increasing costs. Trimmer line spools are relatively expensive. Therefore, it is desirable to protect such spools from damage and also prevent uncontrolled unwinding. In addition to trimmer line spools, adequate protection for spools of wire or line used at other construction and/or industrial sites is also desirable.

Various spool dispensing carts and caddies are known in the art. Typically, such designs include a plurality of spaced spool bars for receiving spools of wire. The spool bars are generally connected to a frame. Some designs include wheels and/or a handle. Although multiple spools may be positioned on such carts or caddies, they often fail to prevent free spinning when unwinding wire from the spools. In addition, many fail to provide adequate protection to the spools. Furthermore, they are typically cumbersome and bulky. Although carts having wheels may be adequate for some applications, they are not easily portable from site to site, especially if the cart or caddy must be lifted into a truck or trailer.

Attempts have been made to provide a spool dispenser that is lightweight and protective. For example, some designs provide a rectangular support frame with spool mounting rods. The mounting rods typically span between opposite side planks. The frame provides some protection to the spool. However, replacement of exhausted spools often requires disassembly of the mounting rods from the side planks. In addition, many such designs fail to address the problem of free spinning of the line or wire from the spool.

In addition to providing a dispenser that is efficient and convenient, it may be desirable to provide a cutting mechanism on the dispenser for cutting a portion of the line or wire being dispensed. Many conventional dispenser designs fail to provide any cutting means. Therefore, there is a need for a combination spool dispenser and cutter that provides adequate protection and that is lightweight and easily portable. The dispenser should also be efficient and convenient, wherein replacement of an exhausted spool is relatively easy and fast.

SUMMARY OF THE INVENTION

A dispenser having a cutting mechanism is provided. The dispenser includes a box-like outer frame for protecting a spool of wire or line. A cross bar is secured to the outer frame, preferably from adjacent corner members. An elongated, cylindrical receiving arm for holding a spool of line extends from the crossbar into an area defined by the outer frame. A first end of the receiving arm is secured to an intermediate position on the crossbar. A second end of the receiving arm is unsecured. The receiving arm includes a tensioning spring, and a pair of retaining washers. A spool of line may be easily passed through an open portion of the skeletal outer frame, and slid onto the receiving arm. The spool is positioned between the two washers, and prevented from free spinning by frictional forces created by the tensioning spring. A fastening pin holds the spool and outer washer in place.

The dispenser preferably includes a cutting mechanism. The cutting mechanism may include a cutter bar, which operates in conjunction with a notched portion of the outer frame to provide a guillotine-like cutting system.

In one embodiment of the present invention, a spool dispenser and cutter includes a skeletal outer frame having a plurality of support members in a hexahedral configuration. A crossbar is attached to at least one of the support members. The crossbar is substantially coplanar with a first face of the outer frame. A receiving arm has a first end attached to the crossbar, and an unsecured second end extending into an area defined by the outer frame. The receiving arm is configured for receiving a spool of line. A cutter bar is hingedly attached to the outer frame. The cutter bar has a cutting surface intermediate first and second ends of the cutter bar for cutting line from the spool.

In another embodiment, a spool dispenser includes a skeletal outer frame having a hexahedral configuration. A crossbar is attached to and extending between opposing support members on a face of the outer frame. A cylindrical arm having a first end secured to the crossbar and an unsecured second end extending into an area defined by the outer frame is provided. The arm is configured for receiving a spool of line. At least one hole extends through the arm proximate the second end. The hole extends generally perpendicular to the axis of the arm. A spring surrounds the arm proximate the first end. A fastener is receivable within the hole. The spool of line is securable between the crossbar and the fastener, and tensioned against the fastener by the spring with sufficient force to prevent the spool from free spinning.

The present invention is also directed to a method of protecting and dispensing line from a spool. A protective frame is provided. The frame has a hexahedral configuration with a receiving arm. The receiving arm has a first end attached to a crossbar of the frame and a spring proximate the first end, and a second unsecured end. The unsecured end extends into an area defined by the frame, and includes a plurality of holes proximate the second end. A spool of line is inserted onto the unsecured end of the receiving arm. The spool is pushed onto the arm until a side of the spool engages the spring, and thereby compresses the spring between the crossbar and the side of the spool. While the spring is compressed, a fastener is inserted into one of the holes. The spring is then allowed to decompress against the spool, thereby tensioning the spool against the inserted fastener with sufficient force to prevent the spool from free spinning.

DETAILED DESCRIPTION OF THE INVENTION

Figure 1:
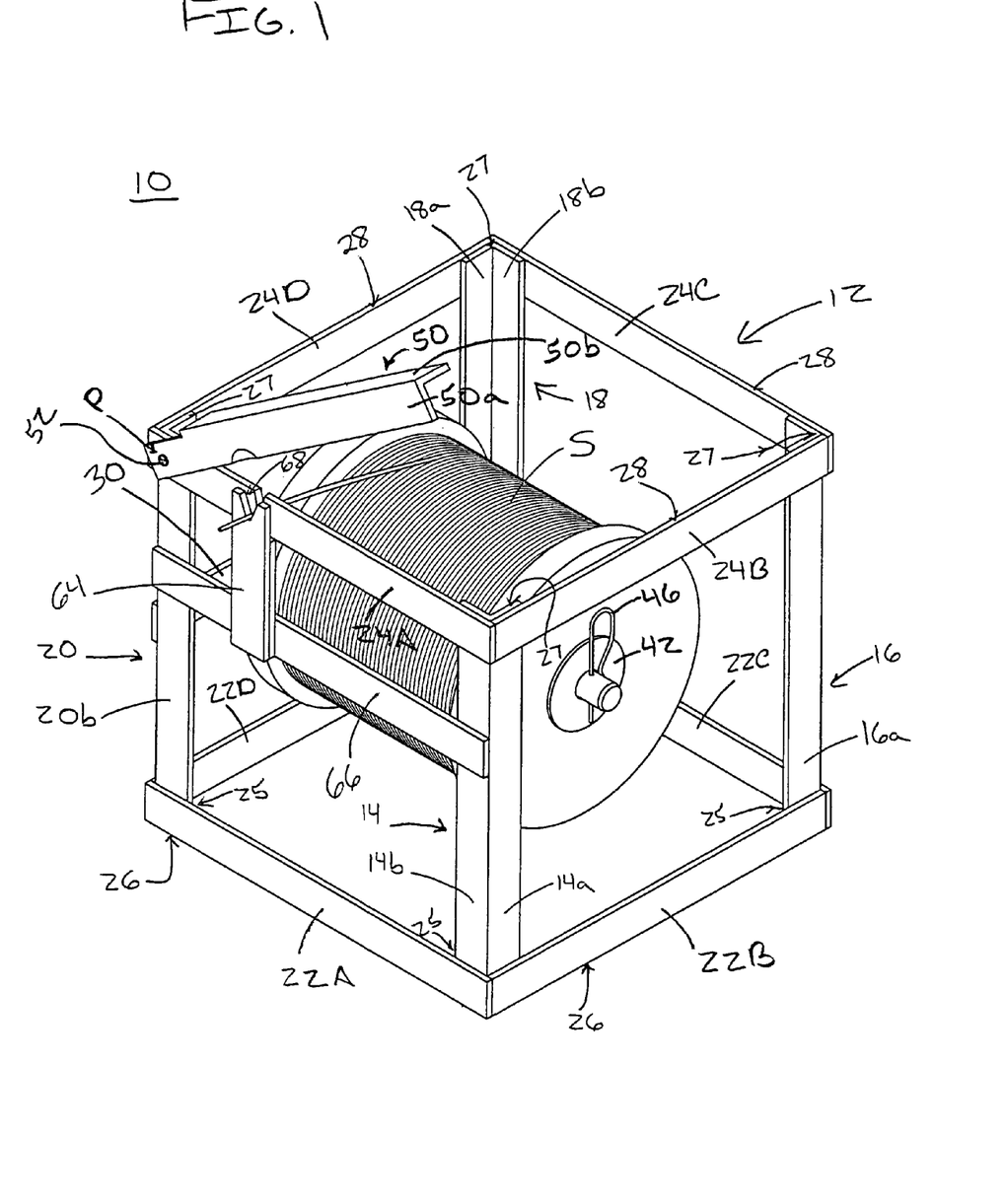
FIG. 1 is a perspective view of a spool dispenser according to the present invention, showing a spool of line secured on a receiving arm of the dispenser.
Figure 2:
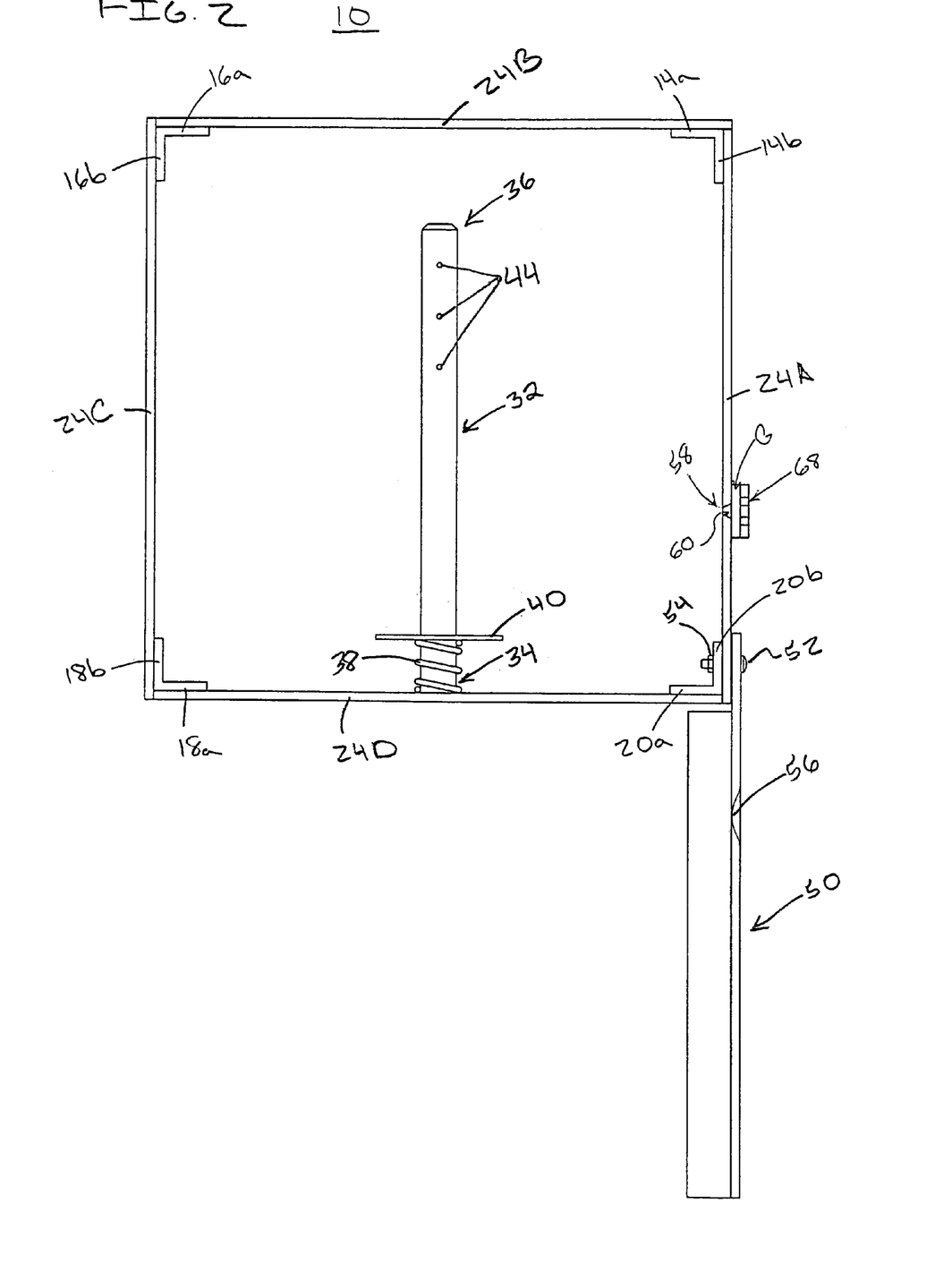
FIG. 2 is a elevational top view of the spool dispenser with the cutter bar open.

As best shown in FIG. 1, a spool dispenser 10 comprises a box-like outer frame 12 for protecting a spool S of wire or line. In a preferred embodiment, outer frame 12 includes four, L-shaped corner members, 14, 16, 18, 20. As best shown in FIG. 2, corner members 14, 16, 18, 20 include first legs 14a, 16a, 18a, 20a, and second legs 14b, 16b, 18b, 20b, respectively. Lower sidebars 22A, 22B, 22C, and 22D extend between coplanar legs of corner members 14, 16, 18, 20. Lower sidebar 22A extends from second leg 14b to second leg 20b; lower sidebar 22B extends from first leg 14a to first leg 16a; lower sidebar 22C extends from second leg 16b to second leg 18b; and lower sidebar 22D extends from first leg 18a to first leg 20a. Upper sidebars 24A, 24B, 24C and 24D are also provided, and similarly extend between coplanar legs of corner members 14, 16, 18, 20.

Figure 3:
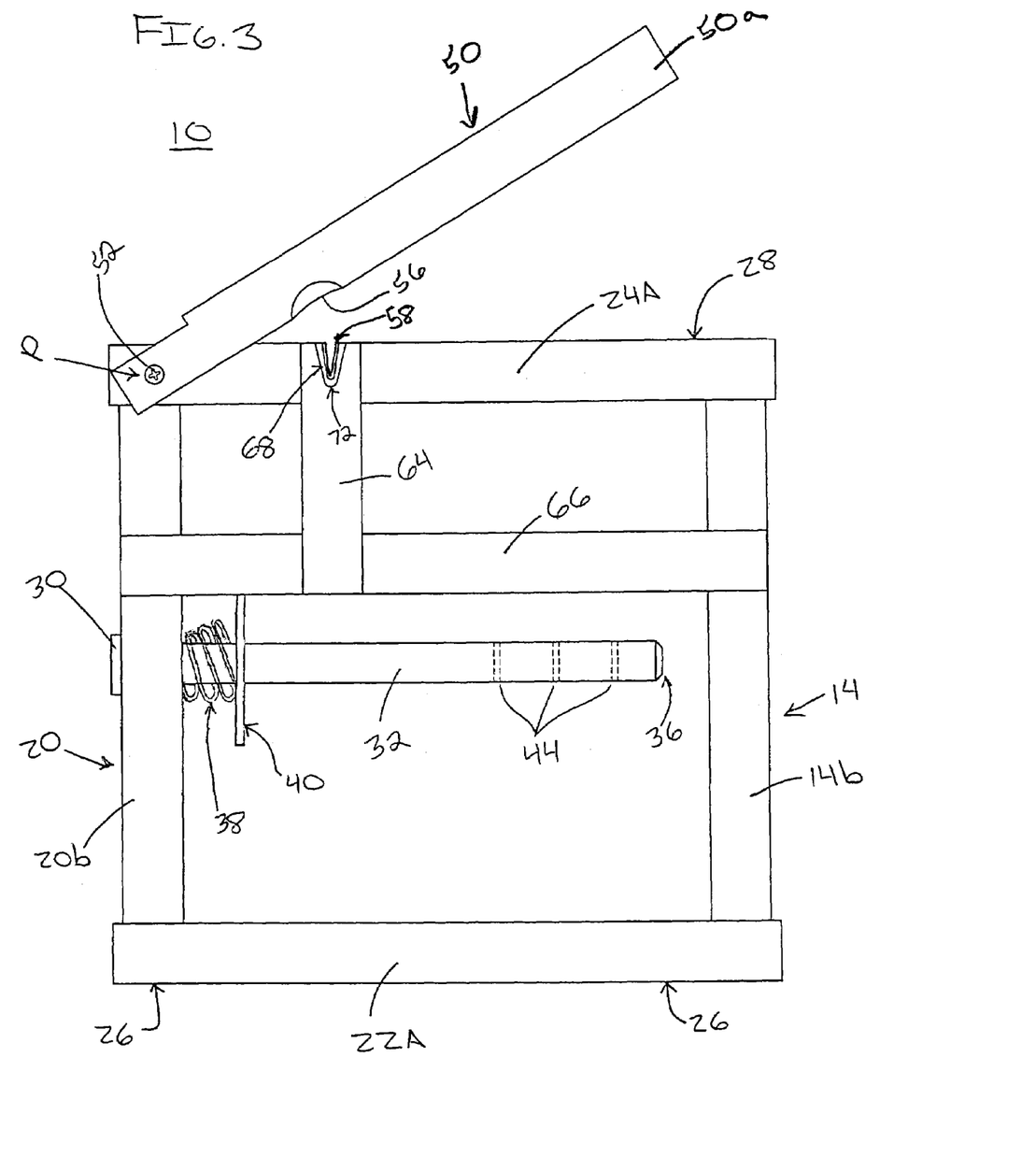
FIG. 3 is an elevational side view of the spool dispenser with the cutter bar partially open.

Lower and upper sidebars 22A–D, 24A–D are secured to opposite ends of each corner member 14, 16, 18, 20 to form box-like outer frame 12. Preferably, corner members 14, 16, 18, 20 have ends 25 that do not extend past edges 26 of lower sidebars 22A–D, as best shown in FIG. 3. More preferably, ends 25 of corner members 14, 16, 18, 20 are coplanar with edges 26. Similarly, corner members 14, 16, 18, 20 have ends 27 that preferably do not extend past edges 28 of upper sidebars 24A–D. More preferably, ends 27 of corner members 14, 16, 18, 20 are coplanar with edges 28.

Outer frame 12 is preferably steel. However, outer frame 12 may also be made from aluminum, titanium, other suitable metals, or even high-strength plastic. Each of sidebars 22A–D, 24A–D may be welded to corner members 14, 16, 18, 20 as known in the art. Sidebars 22A–D, 24A–D may be individual, rectangular, flat planks. Alternatively, lower sidebars 22A–D may be formed from one piece of metal, which is bent to form a rectangular configuration and then secured to corners 14, 16, 18, 20. Upper sidebars 24A–D may also be formed by bending one length of metal to form the appropriate configuration. If sidebars 22A–D, 24A–D are formed from one length of metal, flat planks may also be used for corner members 14, 16, 18, 20 instead of L-shaped members. Lower and upper sidebars 22A–D, 24A–D are preferably welded onto corners 14, 16, 18, 20. However, it should be understood that other means of securing sidebars 22A–D, 24A–D and corners 14, 16, 18, 20 may also be used, such as with adhesive, bolts, fasteners, or the like.

Each corner member 14, 16, 18, 20 is preferably about 10 to 14 inches in length, and each one of the sidebars 22A–D, 24A–D is about 10–14 inches in length. More preferably, outer frame 12 forms a skeletal cube with each side having a length of about 12 inches. In the landscaping industry, milk crate-sized boxes are often used for transporting materials and/or equipment. Thus, dispenser 10 that is about the same size as a milk crate is conveniently transported, stacked, etc. with other such boxes. In addition, a dispenser 10 that is about the same size as a milk crate is an adequate size for receiving and protecting spools of trimmer line commonly used in the landscaping industry. However, it should be understood that the present invention is not so limited, given a dispenser according to the present invention may have various dimensions, as needed for a particular application.

Figure 4:
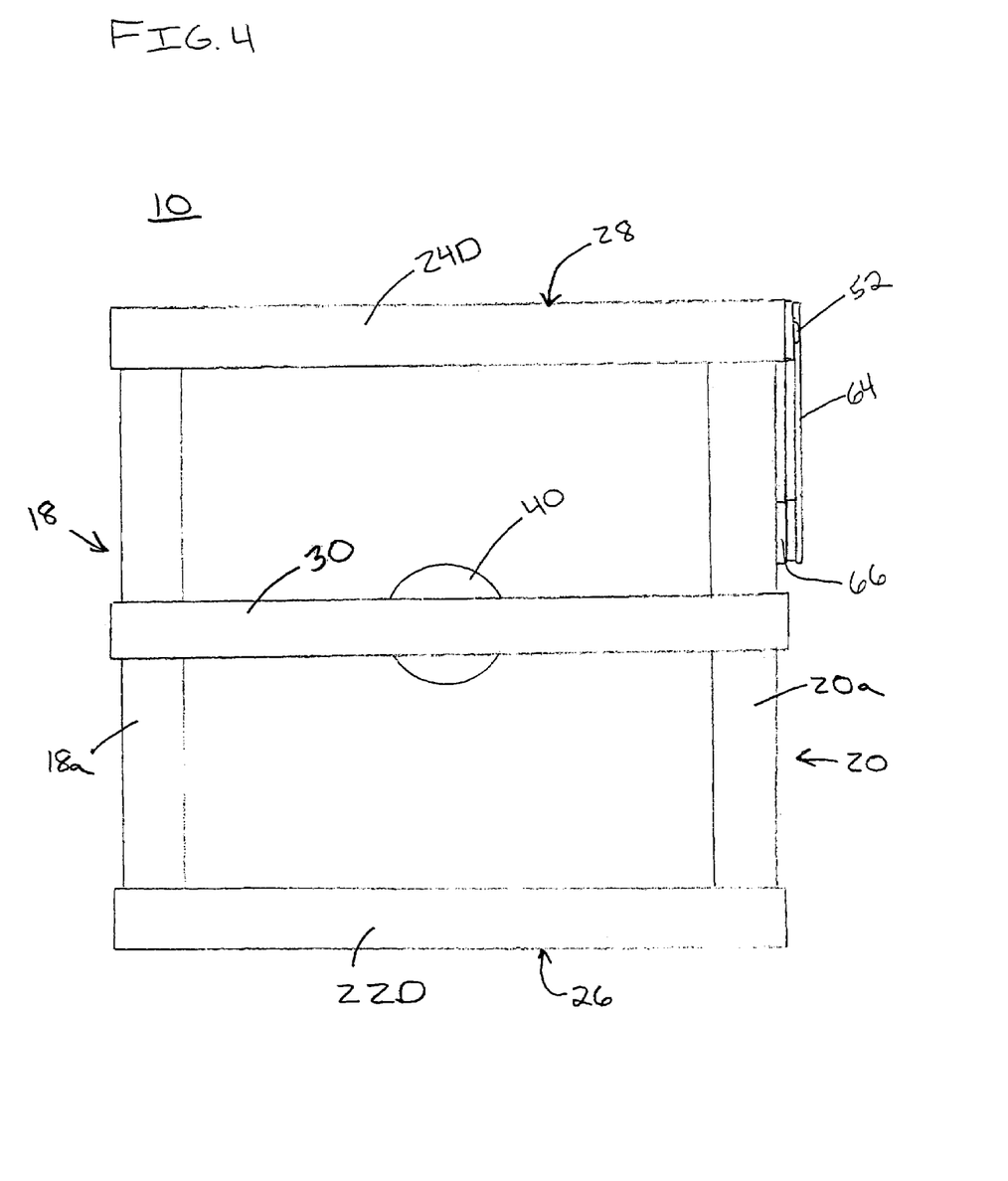
FIG. 4 is another elevational side view of the spool dispenser showing a crossbar.

As best shown in FIG. 4, spool dispenser 10 also includes a first crossbar 30 extending from an intermediate position of sidebar 18 to an intermediate position of sidebar 20. Preferably, first crossbar 30 is secured to the outwardly facing surfaces of second legs 18a and 20a. First crossbar 30 is also preferably steel, and welded to outer frame 20.

However, first crossbar may be formed from other materials, and secured to sidebars 18, 20 by other suitable means as described above. First crossbar 30 is preferably parallel to and evenly spaced between edges 26 and 28, and perpendicular to sidebars 18, 20.

As best shown in FIG. 2, an elongated, cylindrical receiving arm 32 for holding a spool S of line extends from first crossbar 30 into an area defined by outer frame 12. A first end 34 of receiving arm 32 is secured to an intermediate position on first crossbar 30. A second end 36 of receiving arm 32 is unsecured. The second end 36 preferably does not extend past the plane of first legs 14a, 16a. Preferably, receiving arm 32 has a length of between about 8 to 10 inches.

Receiving arm 32 also includes a tensioning spring 38, and a pair of retaining washers 40, 42. Tensioning spring 38 and washers 40, 42 easily slide onto receiving arm 32. One end of tensioning spring 38 may be secured to first crossbar 30, and the opposite end may be secured to washer 40. In this way, spring 38 and washer 40 will not slide off receiving arm 32 when replacing spools S on receiving arm 32. A spool S of line may be easily passed through the open area between corner members 14, 16 and between lower and upper sidebars 22, 24, and slid onto receiving arm 32. One side of the spool S contacts washer 40. Washer 42 is then slid onto receiving arm 32, so that the spool S is sandwiched between the two washers 40, 42.

Figure 5:
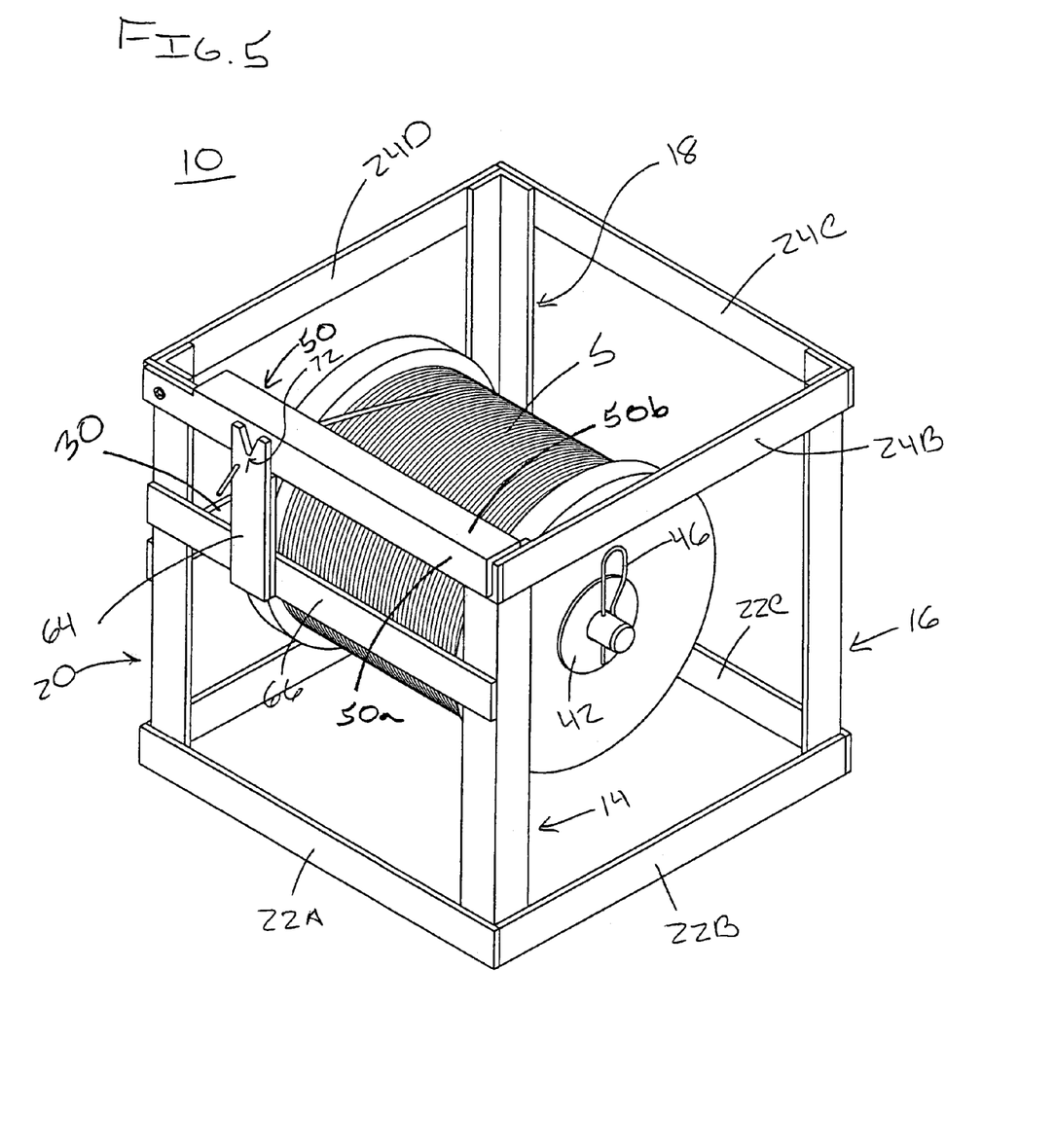
FIG. 5 is a perspective view of the spool dispenser with the cutter bar closed.

Receiving arm includes a plurality of fastening holes 44 and a fastening pin 46. Preferably, fastening pin has a looped configuration, with one portion for passing through one of the fastening holes 44, and another portion that clips around receiving arm 32, as best shown in FIGS. 1 and 5. After the spool S is positioned between washers 40, 42, force is applied to the outwardly facing end of the spool S so that tensioning spring 38 compresses. Fastening holes 44 are positioned on receiving arm 32 so that fastening pin 46 may be passed through one of holes 42 and clipped around receiving arm 32 while tensioning spring 38 is being compressed. Multiple holes 44 are provided so that dispenser 10 can accommodate various spool sizes.

In the preferred embodiment, holes 44 are provided in receiving arm 32 to correspond to three standard sizes of spools S for plastic line trimmer line. For example, three holes 44 may be provided at ⅞ inches, 2 inches, and 3¼ inches from unsecured end 36 of receiving arm 32. Of course, any number of holes 44 may be provided, and spaced as desired, depending on spool size variation and user preference. In addition, the length of spring 38 may vary depending on the spool size. After washer 42 and fastening pin 46 are in place, the force compressing tensioning spring 38 is released. Tensioning spring 38 partially decompresses, and tensions washer 40 against the spool S, maintaining a tensioning force against washer 42 (which is secured by pin 46). In this way, a frictional force is created that prevents the spool S from free spinning, or uncontrollably unwinding when dispensing line. Such free spinning is particularly prevalent with spools of relatively light weight line, such as a spool of line trimmer line.

Dispenser 10 preferably includes a cutting mechanism secured to outer frame 12. In a preferred embodiment, the cutting mechanism includes an L-shaped cutter bar 50, as best shown in FIGS. 1–3 and 5. Cutter bar 50 is pivotally connected to an upper sidebar 24A. Cutter bar 50 is preferably L-shaped, having a first leg 50a and a second leg 50b perpendicular to first leg 50a. First leg 50a is preferably longer than second leg 50b, and is pivotally secured at a point P on upper sidebar 24A with a bolt 52 and nut 54, as best shown in FIG. 2. However, any fastening mechanism may be used, as long as cutter bar 50 is pivotable. Preferably, point P is positioned on upper sidebar 24A at point P, so that bolt 52 also passes through corner member 20b, as shown in FIG. 2. Cutter bar 50 preferably includes a cutting surface 56, which may be a sharpened or flattened edge on cutter bar 50. However, a blade secured to cutter bar 50 may also be provided.

When closed, cutting surface 56 aligns with a V-shaped notch 58 in sidebar 24A. Notch 58 creates a gap along edge 28. In addition, notch 58 includes angled surfaces 60 that flare out on sidebar 24A relative to the interior area defined by outer frame 12, as best shown in FIG. 2. In use, cutter bar 50 is opened by pivoting cutting surface 56 away from notch 58, and a desired length of line is dispensed from the spool S on receiving arm 32. Uncontrolled unwinding is prevented due to tensioning spring 38. The line is then positioned into notch 58 at a point at which the user desires to cut the line. Cutter bar 50 is then closed by pivoting cutting surface 56 toward notch 58, until cutter bar 50 is substantially parallel with and contacting edge 28 on sidebar 24A. Cutting surface 56 thereby cuts the line at the desired point as cutter bar 50 pivots about point P into the closed position, as shown in FIG. 5. Cutter bar 50 provides a guillotine-like cutting system apparatus, with cutting surface 56 chopping the line dispensed from spool S that is held between angled surfaces 60 of notch 58.

As the line is cut, it is wedged into V-shaped notch 58. In addition, the resulting tip of plastic trimmer line splays, expanding the tip into notch 58. Angled surfaces 60 provide space for the line tip to splay. The tip splays so that it has a diameter greater than the interiorly disposed opening of notch 58, but will preferably have a diameter less than the exteriorly disposed opening of notch 58. In this way, the line is held in place in notch 58 due to angled surfaces 60, even if cutter bar 50 is reopened, because the splayed tip of the line cannot easily slide back toward the spool S and out of notch 58. In addition, the tip of the line is wedged into notch 58 given its V-shape. Thus, the line is prevented from tangling or unwinding, given the tip of the line is held in notch 58 and the spool S is held in place by tensioning spring 38.

A guide bar 64 may also be provided, which is secured to a second cross bar 66, as best shown in FIGS. 1–3 and 5. Second crossbar 66 is secured to the outwardly facing surfaces of second legs 14b and 20b. Similar to first crossbar 30, second crossbar 66 may be steel or some other suitable metal, which is welded to outer frame 12. Second crossbar 66 is preferably parallel to edges 26 and 28, and perpendicular to sidebars 14, 20.

Guide bar 64 includes a second V-shaped notch 68 that aligns with notch 58 when guide bar 64 is secured to second crossbar 66. However, a gap G is provided between notch 68 and notch 58 (and guide bar 64 and sidebar 24A) for receiving cutter bar 50, as best shown in FIGS. 2 and 5. Notch 68 has a V-shape corresponding to the shape of notch 58, but may be a larger opening and have a rounded base 72 so that the line does not wedge or catch in notch 68. Guide bar 64 ensures alignment of cutting surface 56 with notch 58, even if cutter bar 50 becomes loosened over time.

When cutter bar 50 is in the closed position, as best shown in FIG. 5, it may function as a handle for easy transport of dispenser 10. The L-shaped configuration of legs 50a, 50b of cutter bar 50 provide a surface that does not dig into a users hand when lifting or moving dispenser 10, even if a relatively heavy spool of line or wire is in dispenser 10. In addition, cutting surface 56 is unexposed and protected by guide bar 64 when cutter bar 50 is closed. Thus, the user may quickly grab dispenser 10 by the "handle" with no potential injury from cutting surface 56.

Dispenser 10 provides many advantages over prior dispenser designs. Outer frame 12 completely surrounds and protects receiving arm 32, and therefore completely protects the spool positioned thereon. The skeletal, outer frame 12 also allows the user to easily see how much line is left on the spool. No disassembly of receiving arm 32 is required for loading a spool in the dispenser, or replacing an exhausted spool. The integral cutting mechanism provides for efficient and convenient dispensing of line.

The configuration of holes 44, notches 58, 68, as well as the preferred dimensions of dispenser 10, are particularly suitable for spools of string trimmer line. However, the dimensions of dispenser 10 may be easily adjusted as desired. In addition, additional holes 44 may be easily provided in receiving arm 32 as required.

A second embodiment of the present invention is best shown in FIGS. 6–10. Some aspects of the second embodiment are identical to the first embodiment, and are identified with like reference numerals.

Figure 6:
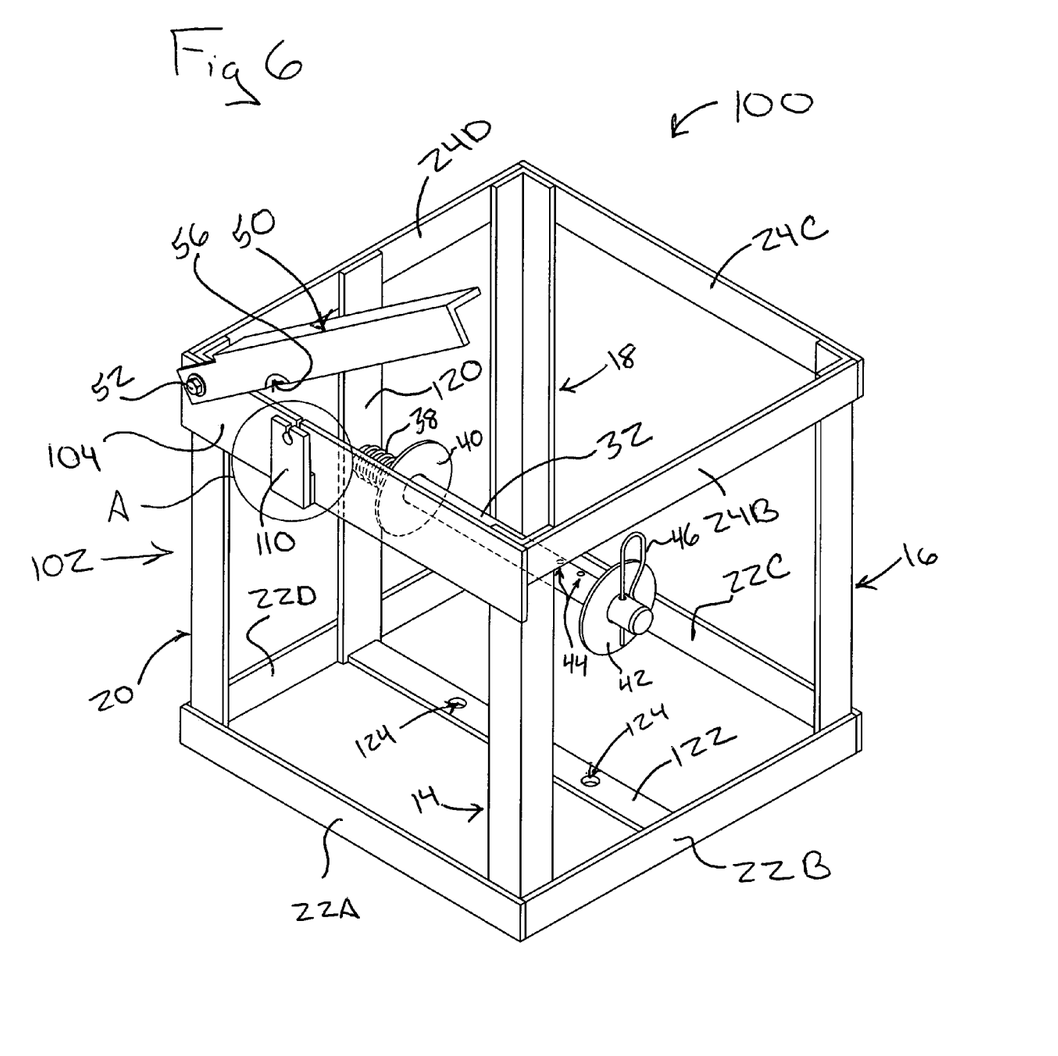
FIG. 6 is a perspective view of a spool dispenser according to a second embodiment.

As best shown in FIG. 6, a spool dispenser 100 includes a skeletal outer frame 102 having a hexahedral configuration. Specifically, dispenser 100 includes L-shaped corner members 14, 16, 18, 20, and lower sidebars 22A–D, and upper sidebars 24B–D, as described above. However, dispenser 100 includes an upper support member 104, as opposed to upper sidebar 24A.

Upper support member 104 is similar to upper sidebar 24A, but preferably has a width that is greater than the width of upper sidebars 24B–D. Cutter bar 50 is preferably pivotally connected to upper support member 104 via bolt 52 and nut 54, as described above. Further, cutter bar 50 includes cutting surface 56.

Figure 7:
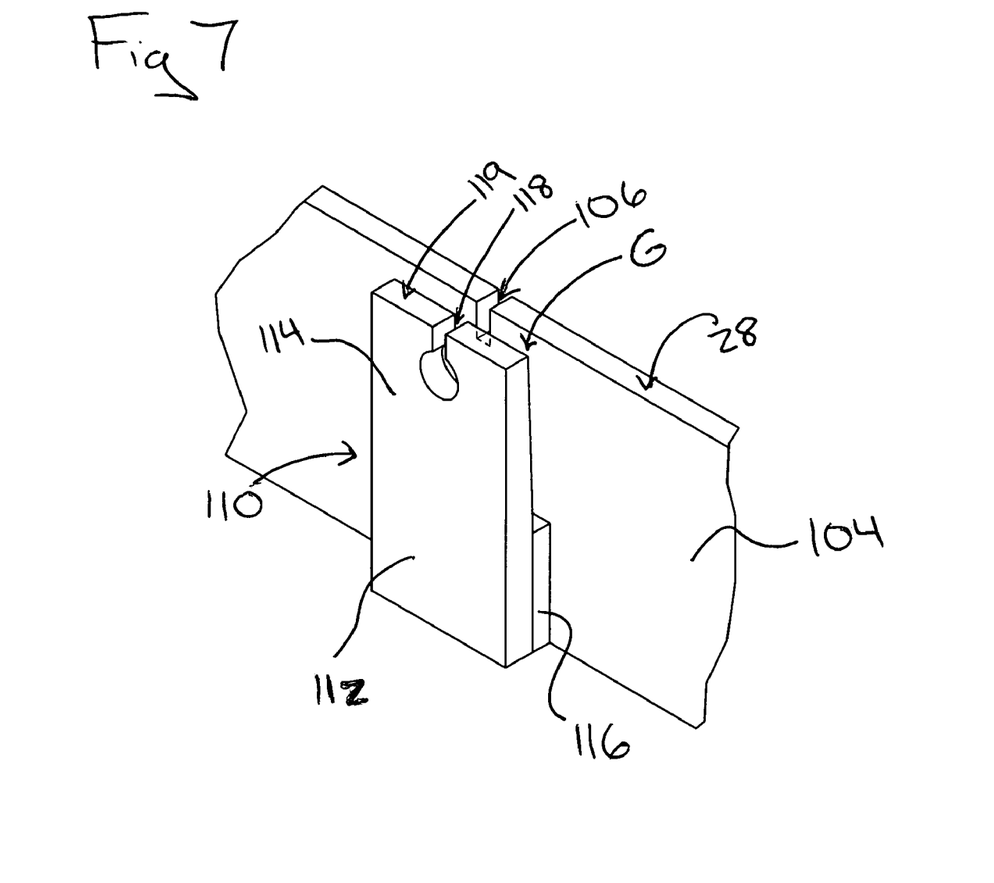
FIG. 7 is a fragmentary view of portion A circled in FIG. 6.
Figure 8:
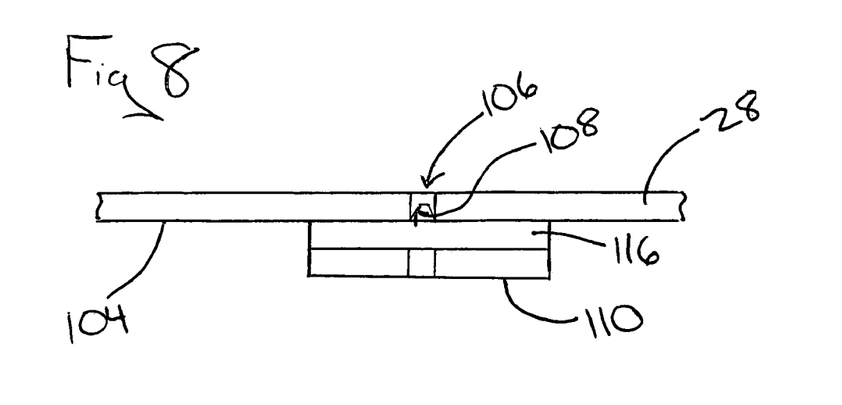
FIG. 8 is a elevational top view of portion A circled in FIG. 6.

As best shown in FIG. 7, upper support member 104 includes a notch 106. Similar to V-shaped notch 58, notch 106 creates a gap along edge 28. Notch 106 also preferably includes angled surfaces 108 that flare outwardly relative to the interior area defined by frame 102, as best shown in FIG. 8.

A guide bar 110 is also provided. The width of upper support member 104 is sufficient to allow guide bar 110 to be secured directly thereon, as best shown in FIGS. 6 and 7. As such, second cross bar 66 is not needed. Of course, it should be understood that additional crossbars may be provided if additional support is required.

Guide bar 110 includes a first portion 112 and a second portion 114. First portion 112 is secured to upper support member 104. Preferably, a spacer 116 is provided intermediate first portion 112 and upper support member 104, so that second portion 114 is spaced from upper support member 104, creating gap G, as best shown in FIGS. 7 and 8. Preferably, guide bar 110 and spacer 116 are welded onto frame 102. However, guide bar 110 may also be secured to frame 102 using adhesive, a fastener, or the like. Any spacer, such as a washer, may be used.

Figure 10:
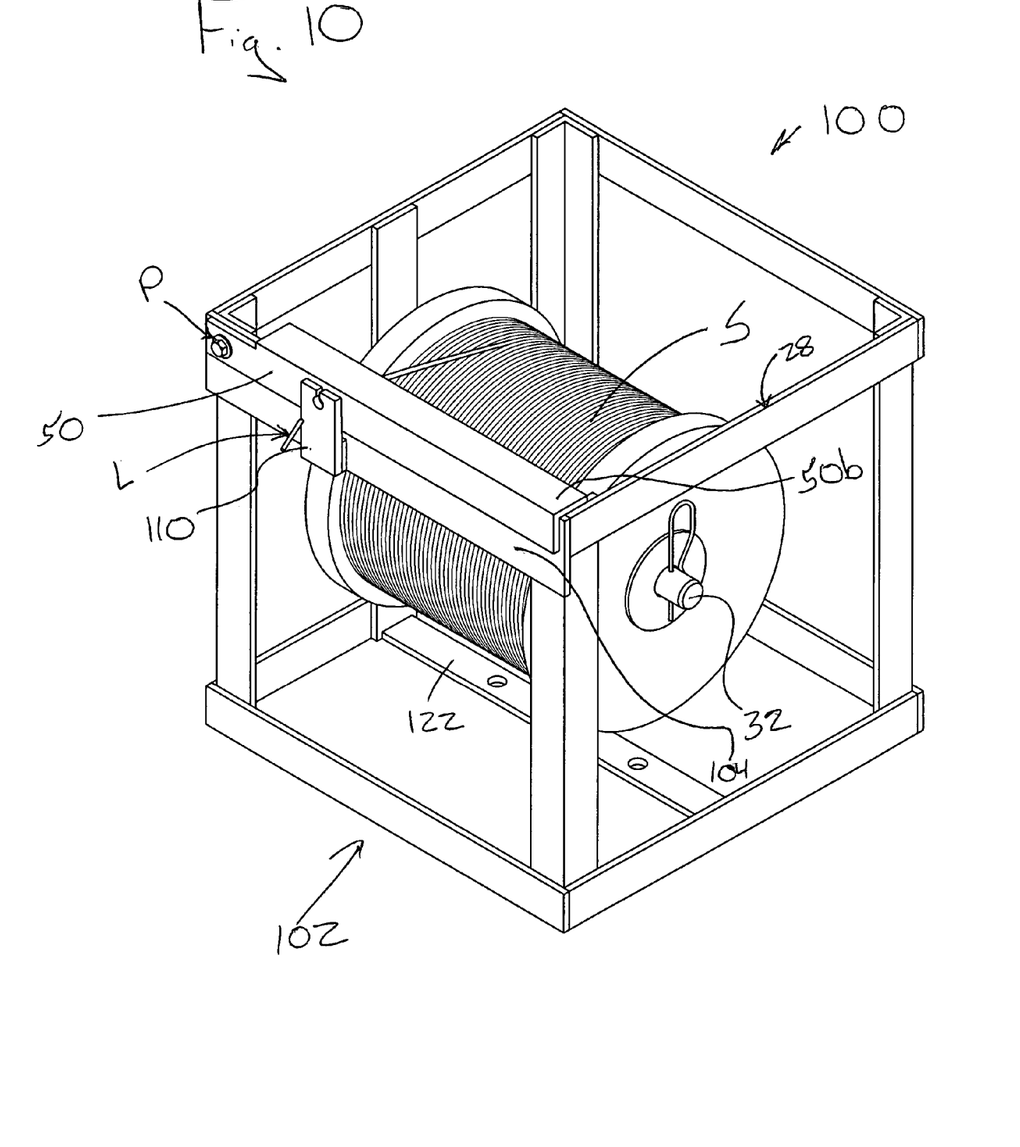
FIG. 10 is another perspective view of the spool dispenser shown in FIG. 9 with the cutter bar in a closed position.

As in the first embodiment, guide bar 110 is aligned with notch 106, and aligned with cutting surface 56 when cutter bar 50 is in the closed position, as best shown in FIG. 10. Guide bar 110 preferably includes a second notch 118 extending from an upper edge 119 coplanar with edge 28, and extending into second portion 114. Second notch 118 is aligned with notch 106. Second notch 118 may have an inverted keyhole configuration, as best shown in FIG. 7.

Dispenser 100 may include first crossbar 30. Alternatively, dispenser 100 may include a crossbar 120 that is secured to the midpoints of upper and lower sidebars 22D, 24D, as best shown in FIG. 6. First end 34 of receiving arm 32 is secured thereto, with unsecured second end 34, as described above. Thus, receiving arm 34 preferably includes a plurality of fastening holes 44, with operatively associated fastening pin 46. Dispenser 100 also preferably includes tensioning spring 38 and washers 40, 42.

Dispenser 100 may also include a mounting bar 122, which may be secured to opposing lower sidebars 22D, 22B, as shown in FIG. 6. Mounting bar 122 includes mounting holes 124, through which fasteners (not shown) may be passed and secured into a support.

Figure 9:
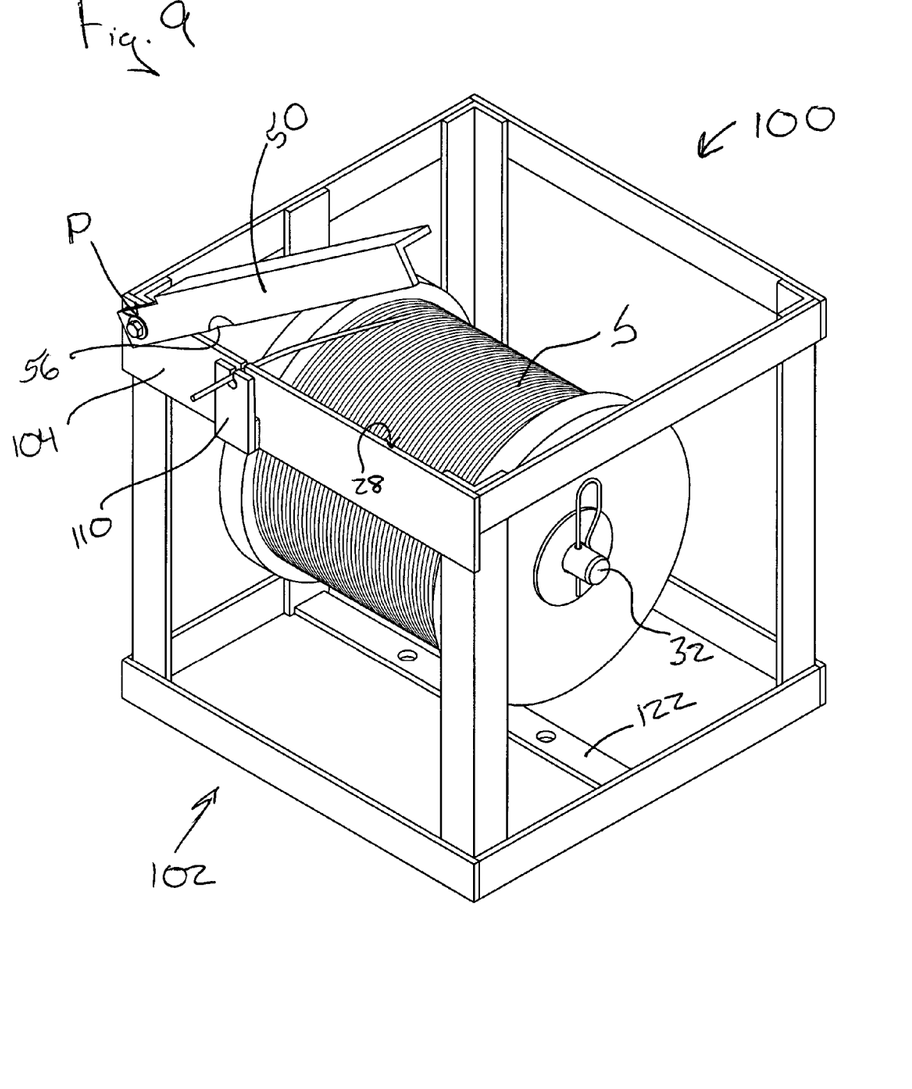
FIG. 9 is a perspective view of the spool dispenser according to the second embodiment with a spool of line secured on the receiving arm and the cutter bar in an open position.

Dispenser 100 functions in a similar manner to dispenser 10. As best shown in FIG. 9, a spool of line is secured on receiving arm 32 as described above. While cutter bar 50 is in an open position, line from the spool is passed through notch 106 of upper support member 104 and through notch 118 of guide bar 110. Cutter bar 50 is then pivoted about point P into a closed position, so that cutting surface 56 cuts the line as it is received in gap G between guide bar 110 and upper support member 104. Given the L-shape configuration of cutter bar 50, second leg 50b of cutter bar 50 rests against edge 28 of upper support member 104. Thus, cutter bar 50 cannot pivot past this closed position, as best shown in FIG. 10.

A portion of line L is cut from spool S. Angled surfaces 108 cause the line to splay, thereby increasing the diameter of the line so that it may not be easily pulled from notch 106 when cutter bar 50 is in the closed position. Further, the tensioning force created by spring 38 prevents the spool from free spinning.

It will be apparent to one of ordinary skill in the art that various modifications and variations can be made in construction or configuration of the present invention without departing from the scope or spirit of the invention. Thus, it is intended that the present invention cover such modifications and variations, and as may be applied to the central features set forth above, provided they come within the scope of the following claims and their equivalents.

I claim:

1. A spool dispenser and cutter, comprising:
  a skeletal outer frame having a plurality of support members in a hexahedral configuration;
  a crossbar attached to at least one of said support members, said crossbar substantially coplanar with a first face of said outer frame;
  a receiving arm having a first end attached to said crossbar and an unsecured distal second end extending into an area defined by said outer frame, said receiving arm configured for receiving a spool of line, said unsecured distal second end of said receiving arm adjacent an opening defined by said outer frame, the spool removable from said receiving arm through said opening;
  a cutter bar having a first end pivotally attached to said outer frame and an unsecured distal second end, wherein said first end of said cutter bar is pivotally attached proximate a corner of said outer frame, said cutter bar having a cutting surface intermediate said first and second ends for cutting line from the spool, wherein said cutter bar includes a first leg substantially coplanar with a second face of said outer frame; and
  a guide bar having a first portion secured to an upper support member on said second face and a second portion spaced from said upper member, said cutter bar receivable between said upper support member and said second portion when pivoted to a closed position;

wherein when said cutter bar is in said closed position, said guide bar is aligned with said cutting surface and said upper support member includes an inwardly extending first notch aligned with said cutting surface; said second portion of said guide bar including a second notch aligned with and spaced from said first notch.

2. The dispenser and cutter of claim 1, wherein said receiving arm is substantially perpendicular to said crossbar.

3. The dispenser and cutter of claim 2, wherein said first end of said receiving arm is attached at a midpoint of said crossbar.

4. The dispenser and cutter of claim 1, wherein said receiving arm has a generally cylindrical configuration.

5. The dispenser and cutter of claim 4, wherein said receiving arm includes a plurality of spaced holes proximate said second end, said holes extending through said receiving arm substantially perpendicular to the axis thereof.

6. The dispenser and cutter of claim 5, further comprising a fastening pin receivable in any one of said holes, the spool securable on said receiving arm between said crossbar and said fastening pin.

7. The dispenser and cutter of claim 6, further comprising a first washer receivable on said receiving arm and intermediate the spool and said fastening pin when the spool is secured on said receiving arm.

8. The dispenser and cutter of claim 7, further comprising a spring surrounding a portion of said receiving arm proximate said first end, the spool tensioned against said first washer by said spring when the spool is secured on said receiving arm.

9. The dispenser and cutter of claim 8, further comprising a second washer receivable on said receiving arm and intermediate said spring and the spool when the spool is secured on said receiving arm.

10. The dispenser and cutter of claim 1, wherein said first face is adjacent said second face.

11. The dispenser and cutter of claim 1, wherein said cutter bar includes a second leg substantially perpendicular to said first leg forming an L-shaped cutter bar.

12. The dispenser and cutter of claim 11, wherein said second leg is substantially coplanar with a third face of said outer frame.

13. The dispenser and cutter of claim 11, wherein said first leg is longer than said second leg.

14. The dispenser and cutter of claim 1, wherein said first leg includes said cutting surface.

15. The dispenser and cutter of claim 1, wherein said outer frame is formed from a material selected from the group consisting of steel, titanium, aluminum, and high-strength plastic.

16. The dispenser and cutter of claim 1, wherein said first notch includes first and second angled surfaces extending outwardly relative to said area defined by said outer frame.

17. The dispenser and cutter of claim 16, wherein said first notch is V-shaped.

18. The dispenser and cutter of claim 1, wherein said second notch is V-shaped.

19. The dispenser and cutter of claim 1, wherein said second notch has an inverted keyhole configuration.

20. The dispenser and cutter of claim 1, wherein said outer frame includes a first substantially rectangular support member, and a second substantially rectangular support member.

21. The dispenser and cutter of claim 20, including a plurality of flat plank support members, each of said flat plank support members having a first end connected to said first rectangular support member and a second opposite end connected to said second rectangular support member.

22. The dispenser and cutter of claim 1, wherein said outer frame includes a lower support member having mounting holes operably associated with fasteners for securing said outer frame to a surface.

* * * * *